United States Patent [19]

Nakashima et al.

[11] Patent Number: 4,754,392
[45] Date of Patent: Jun. 28, 1988

[54] UNIFORM VELOCITY CONTROL METHOD

[75] Inventors: Seiichiro Nakashima; Kenichi Toyoda; Shinsuke Sakakibara; Haruyuki Ishikawa, all of Tokyo, Japan

[73] Assignee: Fanuc Ltd, Minamitsuru, Japan

[21] Appl. No.: 795,936

[22] PCT Filed: Feb. 19, 1985

[86] PCT No.: PCT/JP85/00067
§ 371 Date: Oct. 17, 1985
§ 102(e) Date: Oct. 17, 1985

[87] PCT Pub. No.: WO85/03784
PCT Pub. Date: Aug. 29, 1985

[30] Foreign Application Priority Data

Feb. 20, 1984 [JP] Japan .................. 59-029919

[51] Int. Cl.$^4$ .................. G05B 19/407; G05D 13/00; B25J 9/16
[52] U.S. Cl. .................. 364/167; 364/513; 318/571; 901/20
[58] Field of Search .................. 364/167–171, 364/474, 475, 513; 318/568, 571; 901/15, 17, 18–20

[56] References Cited

U.S. PATENT DOCUMENTS 3,909,600  9/1975  Hohn .................. 364/513
4,086,522  4/1978  Engelberger et al. .................. 364/513
4,420,812  12/1983  Ito et al. .................. 364/513

OTHER PUBLICATIONS

*Industrial Robots;* SME; Dearborn, Mich.; 1983; pp. 7, 8, and 241-244.
*Industrial Robots Directory;* 1982; pp. 37, 133 and 134.

Primary Examiner—Jerry Smith
Assistant Examiner—Allen MacDonald
Attorney, Agent, or Firm—Staas & Halsey

[57] ABSTRACT

A uniform velocity control method for rotating a first movable element (3) at a uniform velocity in a rectilinear-to-rotational motion converting mechanism, in which a second movable element (2c) is moved along a linear shaft (2a) and the first movable element is rotated in dependence upon rectilinear movement of the second movable element. The uniform velocity control method includes (1) a second step of monitoring a position of the second movable element along the linear shaft; (2) a second step of calculating a traveling velocity of the second movable element, which traveling velocity is for rotating the first movable element at a uniform velocity, in dependence upon the position of the second movable element along the linear shaft; and (3) a third step of moving the second movable element at the calculated traveling velocity to make the rotational velocity of the first movable element uniform.

6 Claims, 3 Drawing Sheets

UNIFORM VELOCITY CONTROL METHOD

DESCRIPTION

Background of the Invention

This invention relates to a uniform velocity control method in which the rotational velocity of rotational motion is made constant in a system having a rectilinear-to-rotational motion converting mechanism for converting rectilinear motion into rotational motion.

Summary of the Invention

A rectilinear-to-rotational motion converting mechanism exists for converting rectilinear motion into rotational motion. The converting mechanism moves a first movable element rectilinearly and moves a second movable element rotatively in dependence upon the rectilinear movement of the first movable member. In a rectilinear-to-rotational motion converting mechanism of this type, the second movable element cannot be rotated at a uniform velocity even if the first movable element is moved rectilinearly at a uniform velocity.

Accordingly, an object of the present invention is to provide a uniform velocity control method, whereby the velocity of rotational motion can be rendered uniform through simple means in a rectilinear-to-rotational motion converting mechanism.

Another object of the present invention is to provide a uniform velocity control method in which the rotational velocity of a rotating shaft is made constant by monitoring the position of a movable element along a linear shaft and controlling velocity along the linear shaft in dependence upon the position along the linear shaft.

The present invention provides a uniform velocity control method in which the velocity of rotational motion is rendered uniform in a rectilinear-to-rotational motion converting mechanism. The method includes monitoring the position of a movable element along a linear shaft, and controlling the traveling velocity of the movable element along the linear shaft in dependence upon the position, to render the rotational velocity of a rotating shaft constant.

DETAILED DESCRIPTION OF THE PREFERRED EMBODIMENT

Figure 1:
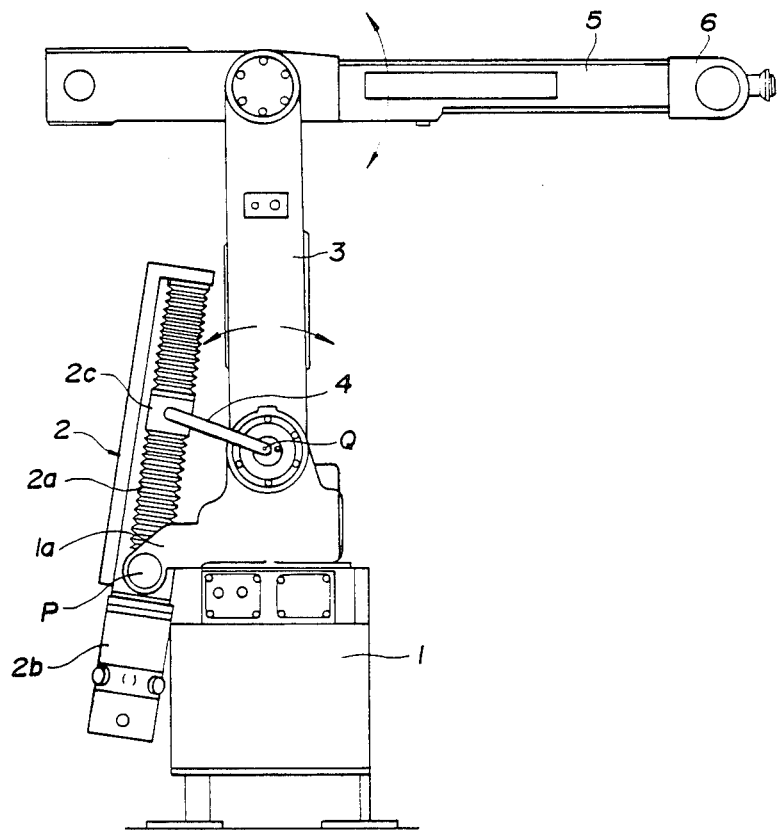
FIG. 1 is a side view of an articulated robot having a rectilinear-to-rotational motion; converting mechanism for converting rectilinear motion into rotational motion.
Figure 2:
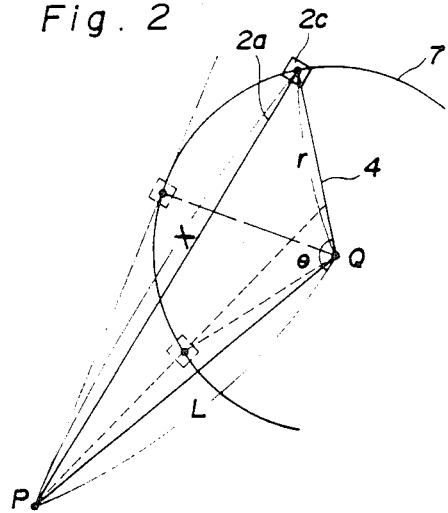
FIG. 2 is a diagram for describing the operation of FIG. 1.

FIG. 1 is an external view of an articulated robot having a rectilinear-to-rotational motion converting mechanism to which the present invention can be applied. FIG. 2 is a diagram illustrating the operation of FIG. 1. A base 1 has an arm 1a provided with a rectilinear drive section 2 rotatable about a fulcrum P. The base 1 is provided with an articulated shaft 3 rotatable about a fulcrum Q. The rectilinear drive section 2 is equipped with a ball screw 2a, a motor 2b for rotating the ball screw 2a, and a movable element 2c having a nut portion threadedly engaged with the ball screw 2a.

The movable element 2c and the shaft 3 are interconnected by a link 4 having a fixed length r. The link 4 is rotatable about the fulcrum Q. Rotation of the link 4 causes the articulated shaft 3 to rotate via a mechanism (not shown). Connected to the distal end of the articulated shaft 3 is an articulated shaft 5 having a distal end provided with a wrist mechanism 6. When the motor 2b is rotated to rotate the ball screw 2a, the movable element 2c moves along the ball screw 2a in a direction conforming to that in which the ball screw rotates, thereby rotating the link 4 about the fulcrum Q. Moreover, the entirety of the linear drive section 2 rotates about the fulcrum P. As a result, the movable element 2c travels on an arc of radius r about the fulcrum Q. More specifically, when the ball screw 2a is rotated to move the movable element 2c successively from the solid-line position to the one-dot chain line position and then to the dashed-line position in FIG. 2, the movable element 2c travels on an arc 7 of radius r about the fulcrum Q, and the link 4 rotates together with the movable element 2c. When the link 4 rotates, the articulated shaft 3 likewise is rotated about the fulcrum Q by a mechanism (not shown). In a rectilinear-to-rotational motion converting mechanism of this type, even if the movable element 2c is moved along the ball screw at a uniform velocity, the movable element will not travel along the arc 7 at a uniform velocity and, as a matter of course, the articulated shaft 3 will not rotate at a uniform velocity.

A uniform velocity control method according to the present invention will now be described with reference to FIG. 2.

In FIG. 2, let x represent the distance from the fulcrum P to the movable element 2c, and let $\theta$ represent the angle defined by the link 4 and a straight line PQ between the fulcrums P and Q. The following equation will then hold:

$$(dx/dt) = (dx/d\theta) \cdot (d\theta/dt) \tag{1}$$

Accordingly, the rotational velocity is given by the equation $$(d\theta/dt) = (dx/dt) \cdot (d\theta/dx) \tag{2}$$

Further, let L represent the distance between the fulcrum P and the fulcrum Q, and let r be the length of the link 4. We will then have the following equation, which is based on trigonometric formulae:

$$x^2 = L^2 + r^2 - 2 \cdot r \cdot L \cos \theta \tag{3}$$

Accordingly, differentiating Eq. (3) with respect to x will allow us to express $(d\theta/dx)$ in Eq. (2) by the following equation:

$$(d\theta/dx) = x/(r \cdot L \cdot \sin \theta) \tag{4}$$

Further, $\sin \theta$ in Eq. (4) is found from Eq. (3) and the following equation:

$$\sin \theta = \sqrt{1 - \cos \theta^2} \tag{5}$$

If we let V represent a commanded rotational velocity and xa a position on the linear shaft of the movable element 2c, then the following equation will hold from Eq. (2):

$$V = (dx/dt) \cdot (d\theta/dx)_{x=xa} \tag{6}$$

Therefore, if the traveling velocity (dx/dt) of the movable element 2c along the linear shaft is controlled in dependence on the present position xa thereof in such a manner that Eq. (6) is satisfied, the rotational velocity can be made constant.

Figure 3:
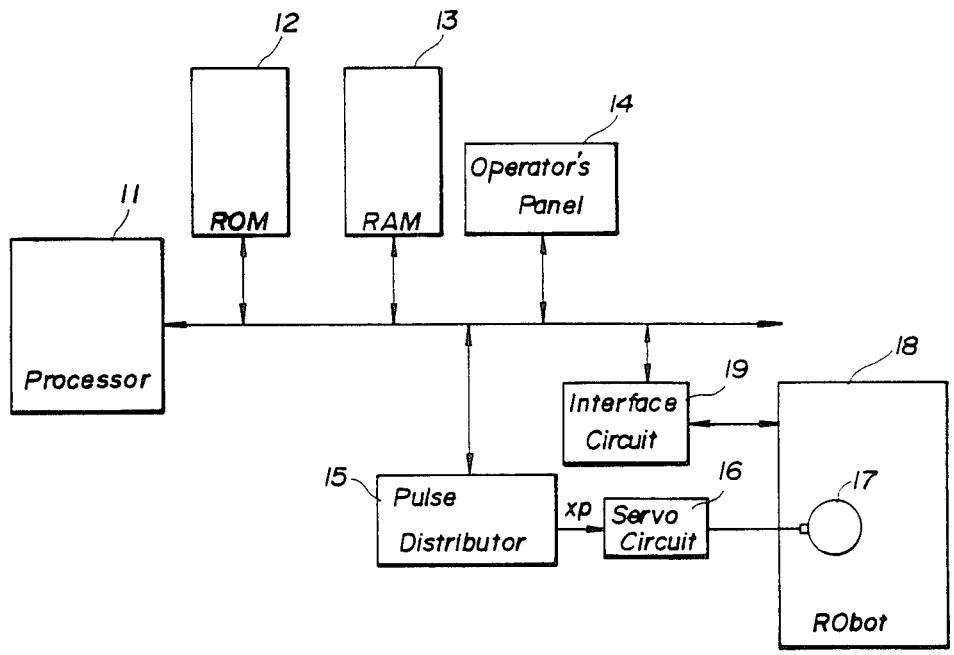
FIG. 3 is a block diagram of a system for practicing the method of the present invention.
Figure 4:
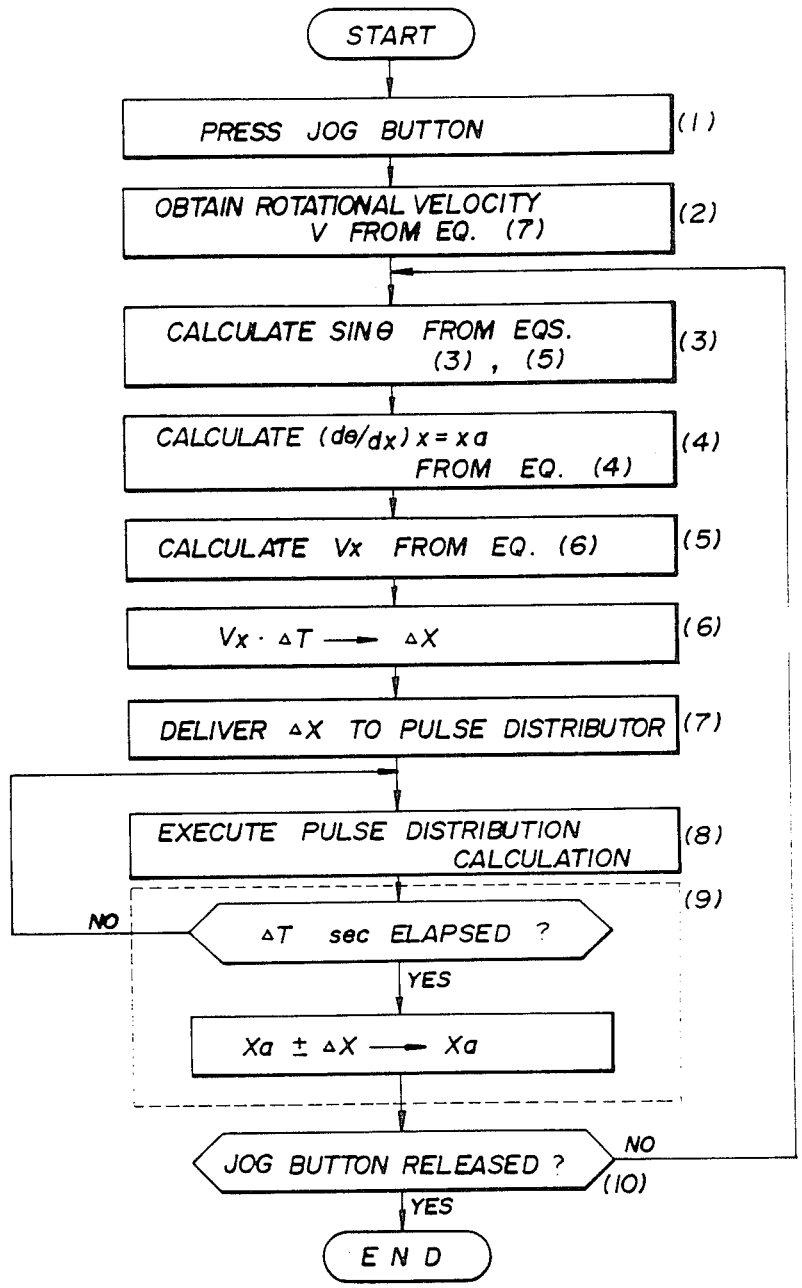
FIG. 4 is a flowchart for the processing performed in accordance with the method of the present invention.

FIG. 3 is a block diagram of a control apparatus for practicing the present invention, and FIG. 4 is a flowchart for processing in accordance with the present invention. The process step numbers mentioned hereinafter are shown at the upper right corner of the respective blocks in FIG. 4.

In FIG. 3, numeral 11 denotes a processor, 12 a ROM storing a control program, 13 a RAM for storing robot command data and the results of processing, 14 an operator's panel, 15 a pulse distributor, 16 a servo circuit, 17 a motor (2b in FIG. 1) for drive along the linear shaft (the ball screw 2a in FIG. 1), 18 a robot, and 19 an interface circuit for controlling the exchange of data between the robot and the control apparatus. Uniform velocity processing according to the present invention will now be described for a case where the articulated shaft 3 (see FIG. 1) is moved by jog feed.

(1) A jog button (not shown) provided on the operator's panel 14 is pressed in order to jog-feed the articulated shaft 3.

(2) When the jog button for the jointed shaft 3 is pressed, the processor 11 calculates the rotational velocity V, which takes an override value into account, based on the equation $$V = F \cdot R \quad (7)$$

where F is the jog feedrate (known) and R is an override value set by an override switch on the operator's panel 14.

(3) Next, the processor 11 evaluates Eq. (3) to find $\cos \theta$ for x=xa (where xa is the present position and is stored in the RAM 13), and thereafter calculates $\sin \theta$ from Eq. (5).

(4) When $\sin \theta$ has been found, the processor 11 substitutes $\sin \theta$ into Eq. (4) and calculates $(d\theta/dx)_{x=xa}$ for x=xa in Eq. (4).

(5) Thereafter, the traveling velocity Vx (=dx/dt) of the movable element 2c is calculated from Eq. (6) by using $(d\theta/dx)_{x=xa}$.

(6) When the traveling velocity Vx along the linear shaft has been found, the processor 11 performs the operation of equation $$\Delta X = Vx \cdot \Delta T \quad (8)$$

to obtain an incremental value $\Delta X$ to be traveled over a predetermined period of time $\Delta T$ sec (e.g., 16 msec).

(7) This is followed by feeding $\Delta X$ into the pulse distributor 15.

(8) The pulse distributor 15 executes a pulse distribution calculation based on $\Delta X$ and generates distributed pulses Xp, which are applied to the servo circuit 16. As a result, the articulated shaft 3 is rotated at the velocity V.

(9) in concurrence with the foregoing processing, the processor 11 performs the operation $$xa \pm \Delta X \rightarrow xa \quad (9)$$

to update the present position xa along the linear shaft of the movable element 2c, which position is stored in the RAM 13, upon passage of $\Delta T$ sec. It should be noted that the sign in Eq. (9) depends upon the traveling direction.

(10) The processor then checks whether the jog button is being pressed. For as long as the jog button is pressed, the processing from step (3) onward continues to be executed every $\Delta T$ sec based on the present position xa obtained from Eq. (9). When this is done, the articulated shaft 3 is rotated at the constant velocity V.

The foregoing case deals with jog feed carried out by pressing a jog button. However, the invention naturally can be applied to a case where motion is controlled based on the robot command data stored in the RAM 13.

According to the present invention as described above, the rotational velocity of a rotating shaft in a rectilinear-to-rotational motion converting mechanism can be made constant through a simple method. Accordingly, the present invention is well-suited for application in cases where the articulated shaft of a robot is rotated at a constant velocity.

What is claimed is:

1. A uniform velocity control method for rotating a first movable element at a uniform velocity in a rectilinear-to-rotational motion converting mechanism in which a second movable element is moved rectilinearly along a linear shaft and the first movable element is rotated in dependence upon the rectilinear movement of the second movable element, comprising the steps of:
   (a) monitoring the position of the second movable element along the linear shaft;
   (b) calculating the traveling velocity of the second movable element, which traveling velocity is for rotating the first movable element at a uniform velocity, in dependence upon the position of the second movable element along the linear shaft, said step (b) including substeps of:
   (b1) obtaining $(d\theta/dx)_{x=xa}$ at a present position xa of the second movable element along the linear shaft, where x represents the position of the second movable element along the linear shaft and $\theta$ represents a rotational position of the first movable element; and
   (b2) calculating the traveling velocity of the second movable element from the obtained $(d\theta/dx)_{x=xa}$ obtained in said substep (b1) and a commanded rotational velocity V; and
   (c) moving the second movable element at the calculated traveling velocity to make the rotational velocity of the first movable element uniform.

2. A uniform velocity control method according to claim 1, wherein said substep (b2) includes calculating the traveling velocity of the second movable element using the equation $V/(d\theta/dx)_{x=xa}$.

3. A uniform velocity control method according to claim 1, wherein the rectilinear-to-rotational motion converting mechanism includes the linear shaft rotatable about a predetermined fulcrum P, the second movable element which travels along the linear shaft, a motor for moving the second movable element along the linear shaft, a mechanism for rotating the linear shaft as the second movable element moves along the linear shaft, as a result of which the second movable element traverses an arcuate trajectory, and the first movable element which rotates about a fulcrum Q based on the position of the second movable element along the linear shaft.

4. A control method according to claim 3, wherein the mechanism for making the second movable element traverse the arcuate trajectory has a link of length r joining the second movable element to the fulcrum Q, and wherein the link is rotatable about the fulcrum Q.

5. A uniform velocity control method according to claim 4, wherein said substep (b1) includes obtaining (dθ/dx) from equations $$x^2 = L^2 + r^2 - 2 \cdot r \cdot L \cdot \cos\theta$$

$$\sin\theta^2 + \cos\theta^2 = 1$$

where the distance between the fulcrums P, Q is expressed by L.

6. A uniform velocity control method according to claim 5, wherein said substep (b2) includes calculating the traveling velocity of the second movable element by $V/(d\theta/dx)_{x=xa}$.

* * * * *

UNITED STATES PATENT AND TRADEMARK OFFICE
CERTIFICATE OF CORRECTION

PATENT NO. : 4,754,392

DATED : JUNE 28, 1988

INVENTOR(S) : SEIICHIRO NAKASHIMA ET AL.

It is certified that error appears in the above-identified patent and that said Letters Patent is hereby corrected as shown below:

Col. 2, line 45, "(2)" should be at the right margin.

Signed and Sealed this

Twenty-second Day of November, 1988

Attest:

DONALD J. QUIGG

*Attesting Officer*     *Commissioner of Patents and Trademarks*